United States Patent
Stair

[19]

[11] Patent Number: 6,015,198
[45] Date of Patent: Jan. 18, 2000

[54] IN-CAR WORK STATION

[76] Inventor: Gary A. Stair, 751 Malena, Ann Arbor, Mich. 48103

[21] Appl. No.: 08/912,077

[22] Filed: Aug. 15, 1997

Related U.S. Application Data

[63] Continuation of application No. 08/438,996, May 11, 1996, abandoned.

[51] Int. Cl.⁷ ..................................................... A47B 83/00
[52] U.S. Cl. ......................... 312/235.1; 108/44; 312/183; 297/188.01; 297/188.11
[58] Field of Search ........................ 108/44, 42; 312/236, 312/183, 235.1; 297/188.2, 188.21, 188.01, 188.11; 206/425, 557; 220/771

[56] References Cited

U.S. PATENT DOCUMENTS

| | | | |
|---|---|---|---|
| 2,934,391 | 4/1960 | Bohnett | 108/44 |
| 3,345,118 | 10/1967 | Cummings | 108/44 |
| 3,909,092 | 9/1975 | Kiernan . | |
| 4,158,428 | 6/1979 | Bates . | |
| 4,577,788 | 3/1986 | Richardson | 108/44 X |
| 4,619,386 | 10/1986 | Richardson . | |
| 4,765,583 | 8/1988 | Tenner . | |
| 4,795,210 | 1/1989 | Milat | 297/188.2 X |
| 4,796,791 | 1/1989 | Goss et al. | 108/44 X |
| 4,823,241 | 4/1989 | Radcliffe | 108/44 X |
| 4,832,241 | 5/1989 | Radcliffe . | |
| 4,923,248 | 5/1990 | Feher | 297/180.11 |
| 4,928,865 | 5/1990 | Lorence et al. | 108/44 X |
| 4,946,120 | 8/1990 | Hatcher . | |
| 5,085,153 | 2/1992 | McKee | 108/44 |
| 5,092,507 | 3/1992 | Szablak et al. . | |
| 5,169,001 | 12/1992 | Scheibel | 206/425 |
| 5,307,968 | 5/1994 | Kalmbach . | |
| 5,329,979 | 7/1994 | Miller et al. | 108/44 X |
| 5,390,608 | 2/1995 | McLaren et al. | 108/44 |
| 5,396,996 | 3/1995 | Box | 206/425 X |

*Primary Examiner*—Peter M. Cuomo
*Assistant Examiner*—Stephen Vu
*Attorney, Agent, or Firm*—Harness, Dickey & Pierce, P.L.C.

[57] ABSTRACT

An in-car work station adapted to be supported on an front passenger seat and provide easy access from the driver seat. The work station has an immovable top surface located adjacent to the front of the work station which can be used as a support surface for articles being used by the occupant of vehicle. A drawer is provided in the work station and is laterally extendable from its stored position to a use position where the drawer extends in the inboard direction toward the driver seat thereby increasing access by the driver. The drawer includes a receptacle cavity having a support tray for receiving a note pad thereon and readily permitting access from the driver seat to the note pad.

9 Claims, 5 Drawing Sheets

IN-CAR WORK STATION

This is a continuation of U.S. Pat. application Ser. No. 08/438,996, filed May 11, 1995, now abandoned.

BACKGROUND OF THE INVENTION

1. Field of the Invention

The present invention generally relates to work stations that provide a work area as well as a storage area within an automobile vehicle. More particularly, the in-car work station of the present invention relates to a work station intended to be placed in the front passenger seat of the vehicle so as to provide the driver of the vehicle with a mobile office having an area for writing, operating a portable computer, and storing files, in addition to an area for storing supplies and equipment such as note pads, paper clips, staplers, pens, dictation machines and mobile phones. Specific attributes of the present invention allow for accessibility from the vehicle's driver seat thereby enhancing and increasing its usefulness over prior art designs.

2. Description of the Prior Art

In todays highly mobile society, many individuals find it necessary to work out of their car or truck. As such, the motor vehicle becomes a mobile office. These individuals obviously include but are by no means limited to sales, marketing and customer service representatives, building contractors and delivery people. In short, principally any individual whose scope of employment requires them to regularly meet with clients at a location outside the main or base office.

While the above is not an exhaustive listing of individuals and the particular needs of each job will vary, it can be seen that these professions require that the individuals keep or take with them the various documents, files and supplies they will need to properly service the needs of their clients. In addition to having files and supplies on hand, these individuals may also find it beneficial and/or necessary to have an area in their vehicle where they can make written notations, utilize a notebook computer, portable phone or other electronic mechanism, and stay in communication with the home office or other clients.

Previously, individuals who needed to work out of their vehicle relied upon the standard brief case, or just a plain box, in order to store and organize the anticipated daily materials. Opened up and set upon the passenger's seat, these "containers" not only proved to be inconvenient and cumbersome, but have also proven to be too small and generally unworkable. One reason for the inconvenience of these containers was that they required all of their contents be taken with the individual when the individual left the vehicle in calling upon a client, even though only a small fraction of these contents might actually be relevant to that particular client. With respect to their actual usefulness in the vehicle, these containers provided little in the way of a usable writing surface. Typically, a clip board was utilized for that purpose.

Recognizing the limitations of the above, some manufacturers began offering portable consoles or work stations designed with an eye toward the convenience of the individual who must work out of a vehicle.

This next generation of in-car work stations generally included a design intended for placement on the vehicle's front passenger seat or attachment to the front dashboard so that an individual, in the driver's seat, has some access to storage and work areas on the work stations or consoles. Often, these prior apparatuses were provided with a hinged top that not only concealed the various storage compartments of the console, but also doubled as a writing surface.

While better than a mere box or briefcase, second generation work stations have proven to be less than ideal. Their foremost and most common deficiency has seemed to be that actual use of the console from the driver's seat was not specifically designed into the work stations. While they could be accessed, they were actually little more than a storage compartment in the passenger seat. In order to take written notes while in the vehicle, the occupant was required to lean over the center console or arm rest in an awkward position to write on the top of the work station. Additionally, if using the top surface of the work station for writing purposes, it was not possible to simultaneously access a file within the work station, let alone have enough usable surface space for opening and spreading out a necessary file or document. Also, the minimal usable surface area prevented the simultaneous use of, and easy access to, other devices such as notebook computers.

In view of the foregoing limitations and shortcomings of the prior articles, as well as other disadvantages not specifically mentioned above, it should be apparent that there still exists a need for an improved in-car work station. Specifically, one which is functional while also providing the user with enhanced accessibility to the various portions of the work station and a better orientation of the various work areas in relation to use from the driver's seat of the vehicle.

It is therefore a primary object of this invention to fulfill that need by providing an in-car work station which has been designed with the specific intent of providing increased access and usability from the driver's seat of the vehicle.

It is a further object of this invention to provide an in-car work station which is positioned on the passenger seat cushion within the vehicle.

It is also an object of this invention to provide an in-car work station which can be accessed through the passenger door of the vehicle so that files, stored in the work station, can be removed as needed during a client visit.

Another object of this invention is to provide an in-car work station with an extendable portion, in the direction of the driver, which increases the usable work area of the work station while also providing the driver with a writing surface within easy reach from the driver seat, specifically over the vehicle's center console.

An additional object of this invention to provide an in-car work station which functions as an in-car desk have most or all of the accompanying desired features of work space and supply storage.

Yet a further object of this invention is to provide an in-car work station which includes an area adapted to receive a portable or notebook computer for use from the vehicle's driver seat.

Still another object of this invention is to provide an in-car work station which can be connected to the electrical system of the vehicle to provide multiple outlets for the attachment of various electronic equipment, as might be used by the occupant of the vehicle.

SUMMARY OF THE INVENTION

Briefly described, these and other objects are accomplished according to the present invention by providing an in-car work station which rests on the passenger seat of the vehicle. The forward end of the in-car work station (hereinafter just work station) is supported by a pair of legs which extend downward to contact the floor pan of the vehicle. The rearward end of the work station is secured and retained to the passenger seat through utilization of the passenger seat belt.

As initially positioned in the passenger seat of the vehicle, the work station has a box-like construction which extends from the seat back to a location where it is beyond the forward edge of the seat cushion itself. The box-like construction of the work station defines a flat top surface that is further sub-divided into different usable areas.

Toward the rear of the top surface are two storage compartments, one located in-board of the other. The in-board storage compartment is provided with a hinged lid or cover which normally remains closed. When opened, the lid exposes the internal cavity of the compartment in which various work related supplies may be stored. Additionally, this cavity may be further compartmentalized by the incorporation of dividers allowing for customized organization. The outboard storage compartment is generally open and is sized so as to receive a removable, basket-like file holder or carrier. The holder itself is designed and sized to receive standard hanging files or file folders.

The files are specifically located on the outboard side of the work station for two reasons. First, by positioning the files toward the outboard side of the work station, the driver is unencumbered by the files when trying to access the various other features of the work station. Additionally, should the vehicle drivers need to take files from the work station into a client's facilities during a client visit, the location of the files readily allows for their removal, either individually or with the whole carrier, through the passenger door.

Forward of the two above mentioned compartments, the top surface is flat and substantially free of obstructions. The forward outboard perimeter of this area of the top surface is defined by an upwardly extending lip that prevents objects from inadvertently sliding off of the top surface. Additionally, two cigarette lighter-type electrical outlets are located in the top surface, generally towards the outboard side and near the outboard compartment. These plugs as well as additional plugs located elsewhere on the work station allow for various electrical devices to be connected to the electrical supply system of the vehicle for operation or recharging of their internal batteries. This forward area of the top surface is purposely left unobstructed so that it can be used as a place to spread out the contents of the files of a place to locate a portable or lap top computer.

The forward end of the work station also encloses additional features of the present invention. These are generally illustrated as three drawer-like members which extend in the in-board direction, laterally from the work station toward the driver. The lowermost of these members is a lockable drawer in which personal articles may be secured. Forward of and adjacent to the lockable drawer are two additional cigarette lighter-type electrical outlets.

Immediately above the lockable drawer is a larger drawer member. Upon the opening of this drawer, it is revealed that the width of the drawer is of a size that can receive a standard size note pad within it. In this fully extended position, the note pad is brought significantly closer to the driver of the vehicle and the work station is correspondingly provided with an L-shaped configuration. As such, the work station of the present invention brings the writing pad over to at least the middle of the vehicle allowing the driver to more easily and comfortably take notes or otherwise jot down needed information. In the case where the driver is left-handed, it is readily seen that by bringing the writing pad to the center of the vehicle, a left-handed individual can also more easily turn their body to reach the writing pad.

To further enhance the usability of note pad, the note pad is supported in the drawer on a tray that can be inclined and/or swiveled with respect to the occupant of the vehicle driver's seat. This further increases the degree of comfort and ease with which the writing pad may be used.

Immediately above the note pad drawer is another drawer-like member. The width of this uppermost drawer corresponds to that of the note pad drawer and, as such, it can operate as a cover for the note pad drawer when extended. Additionally, this drawer acts as an extension of the top surface thereby increasing the usable surface area for spreading out files, maps or electronic equipment.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
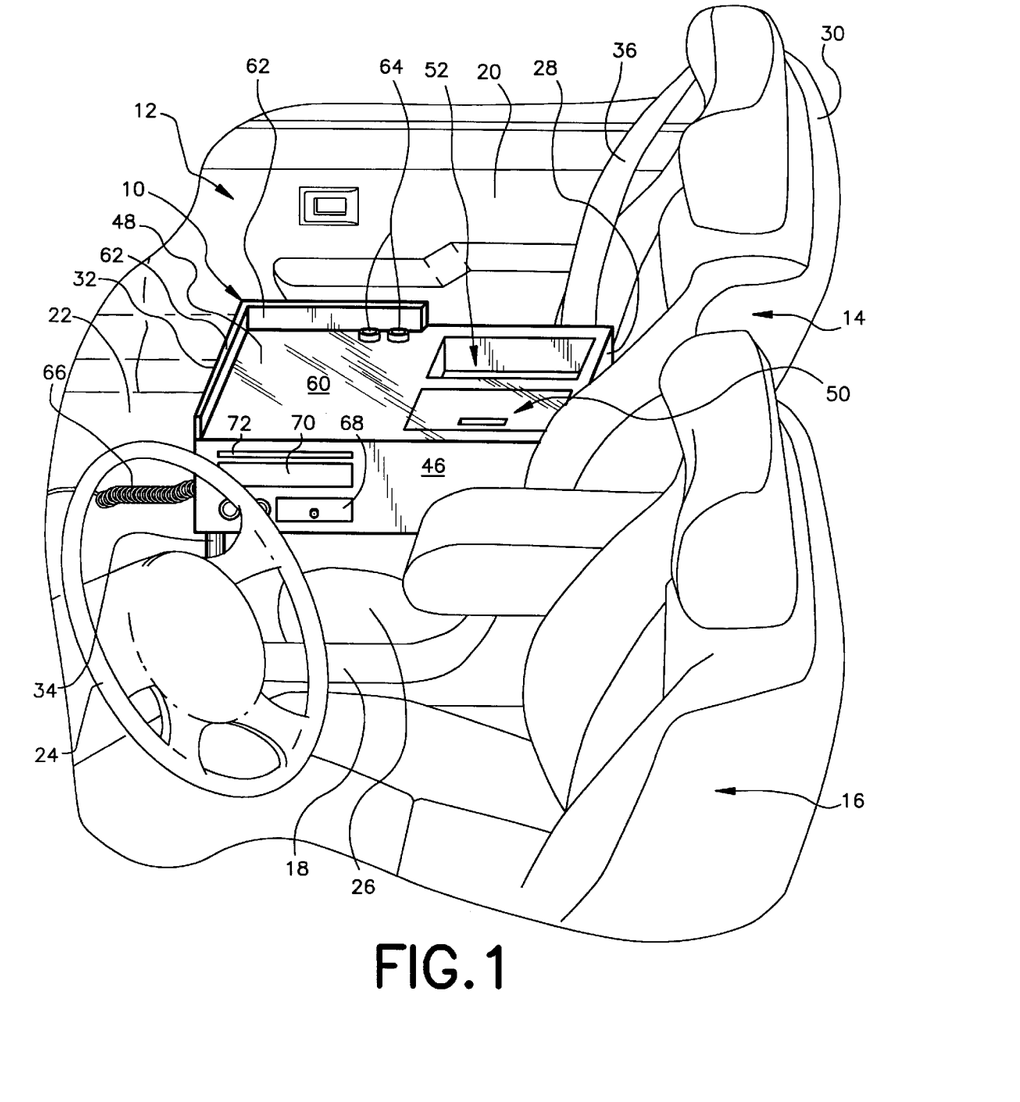
FIG. 1 is a perspective view of a vehicle interior illustrating the positioning of the present invention within the passenger seat of the vehicle.

Referring now in detail to the drawings, there is shown in FIG. 1 an in-car work station embodying the principles of the present invention and generally designated at 10. The in-car work station (hereinafter work station) 10 is shown in FIG. 1 as it would be located within an automotive vehicle 12, of which only a portion is actually illustrated. For the present discussion, the relevant components of the vehicle interior include a passenger seat 14, a driver seat 16, a center console 18, a passenger door 20, a passenger side floor pan 22 and a steering wheel 24.

As is evident from the figure, the work station 10 of the present invention generally has a box-like construction and is sized so that it can be positioned on the seat cushion 26 of the passenger seat. The rearward end 28 of the work station 10 is located so that it generally abuts the seat back 30 while the forward end 32 of the work station 10 extends beyond the forward end of the seat cushion 26 in an overhanging portion. To assist in supporting the forward end of the work station 10, a pair of downwardly extending legs 34 are located to depend from the overhang area into contact with the passenger side floor pan 22. Because the height of the passenger seat 14 will vary for each particular vehicle, the legs 34 are adjustable in height. Any conventional mechanism for allowing height adjustment of the legs 34 could be employed with the present invention. For example, one such adjustment mechanism might employ telescopic sections in which a spring biased button selectively engages a series of apertures formed in the telescopic sections to permit multiple adjustment heights. While a single leg 34 generally in the center of the overhang area could be used, preferably, a pair of legs 34 are used and positioned near the forward side corners of the work station's overhang area.

Figure 2:
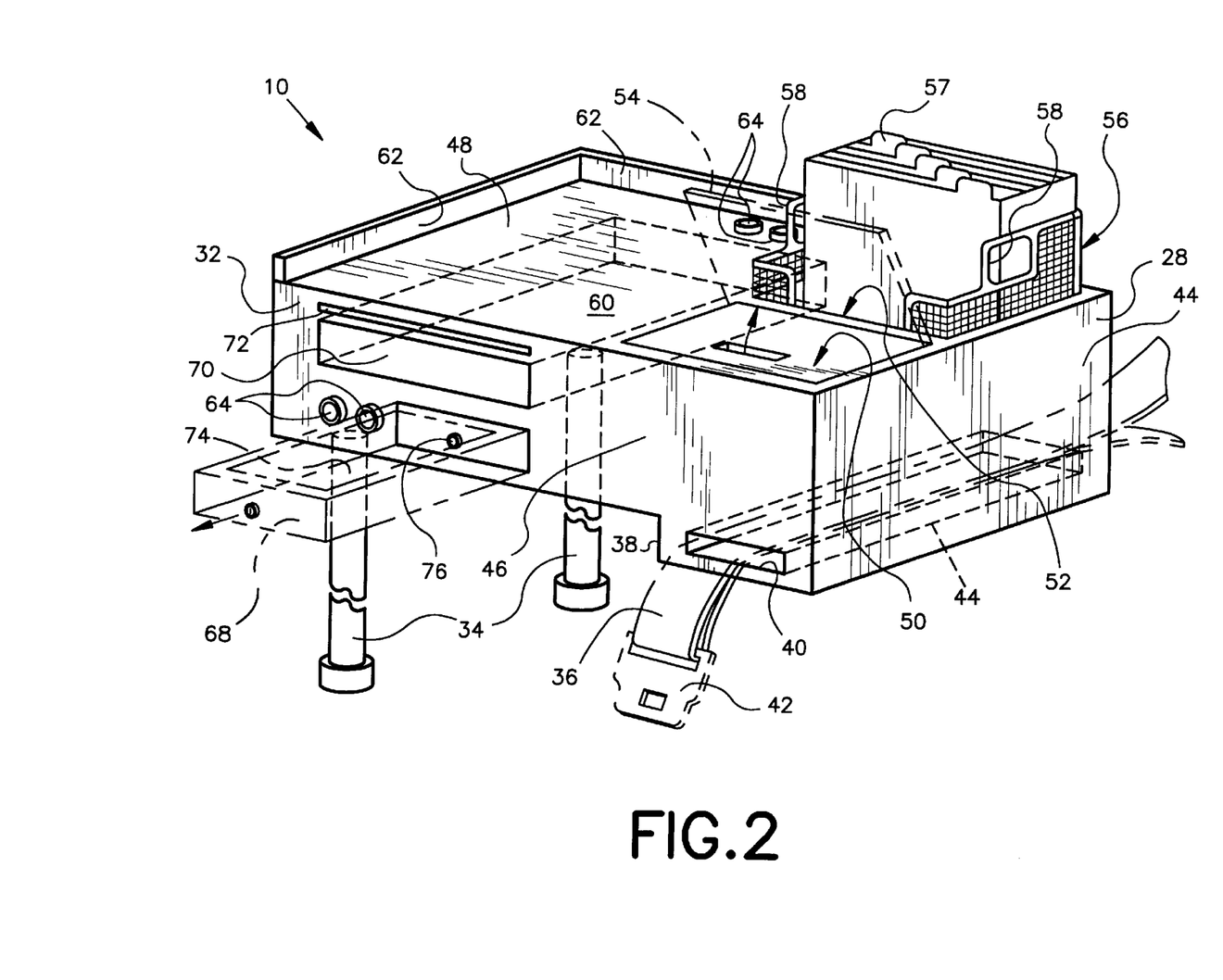
FIG. 2 is a perspective view of the present invention with the passenger's seat deleted so that all of the features of the present invention can be more readily seen.

Returning back to the rearward end 28 of the work station 10, it is seen in FIG. 2 that the work station 10 is retained or secured to the passenger seat 14 through an engagement with the passenger side seat belt 36. To accommodate the seat belt 36, the rearward end 28 of the work station 10 is provided with a drop 38 through which is formed a transversely directed slot or passageway 40. The buckle 42 and seat belt 36 are passed through the slot 40 from the outboard side 44 of the work station 10 until exiting the slot 40 from the inboard side 46, at which point the buckle 42 engages a latch (not shown) of the seat belt assembly. Once engaged, the seat belt is then cinched tight, firmly securing and retaining the work station 10 in the passenger seat 14 in the event of an abrupt stop of the vehicle 12.

In the top surface 48 of the work station 10, it can be seen that two compartments are formed toward the work station's rearward end 28. These compartments are located toward the sides of the work station 10 and are hereinafter referred to as inboard compartment 50 and outboard compartment 52.

The inboard compartment 50 is provided with a hinged lid 54 that operates as a cover for the internal cavity of the compartment 50. The hinge of the lid 54 is positioned toward the outboard side 44 of the work station 10 so that, when the inboard compartment 50 is opened, the lid 54 swings in the outboard direction. In this way, the lid 54 itself does not obstruct access into the inboard compartment 50 from the drivers side of the vehicle 12. Internally, the inboard compartment 50 can be provided as a single storage compartment or it may be further sub-divided by fixed or movable dividers to accommodate variously sized supplies. An illustrative example of the supplies that might be stored in the inboard compartment include pens, self-adhesive note pads, paper clips, and a stapler.

The outboard compartment 52 can be principally described as being in an open well as seen in FIG. 1. A removable basket or holder 56, of a size which allows it to receive hanging or standard file folders, is received within the outboard compartment 52. The file holder 56 is provided with handles 58 which readily allows for the holder 56 to be removed from the outboard compartment 52 along with the files 57.

The file holder 56 and its associated files 57 are specifically located in the outboard compartment 52 for several reasons. First, in this manner, the files 57 and file holder 56 are positioned where they will not interfere with use of any of the features previously discussed above or further discussed below. This is achieved while still maintaining easy access to the files 57. Additionally, the file holder 56 is located in the outboard compartment 52 so that should the vehicle's driver need to take files into a client's facility during a call on the client, the file holder 56 can be easily withdrawn out of the outboard compartment 52 through the opened passenger door 20. Furthermore, the file holder 56 and outboard compartment 52 are located toward the seat back 30 of the passenger seat 14 so that the maximum open width of the passenger door 20 can be used while withdrawing the file holder 56 and files 57. In this way, any accessibility problems created by the hinge on the forward edge of the passenger door and the narrow open width of the passenger door 20 at its forward end are eliminated and overcome.

Forward of the inboard and outboard compartments 50 and 52, the top surface 48 generally defines a free work area, designated at 60, whose forward and outboard perimeters are defined by an upstanding lip 62. The free work area 60 is provided as an area where the files 57 can be laid open and spread out without interfering with the various other features of the work station 10. The lip 62 prevents the files as well as pens or other items from falling or rolling off the free work area 60 during movement of the vehicle 12.

Additionally, along the outboard side edge of the free work area 60, generally toward the outboard compartment 52, are a pair of cigarette lighter-type electrical outlets 64. The electrical outlets are coupled through a cord or conductor 66 to the electrical supply system of the vehicle 12. One method of coupling these outlets 64 to the electrical system of the vehicle is to provide the cord 66 with a plug (not shown) that can be inserted into the cigarette lighter outlet of the vehicle. Alternatively, the cord 66 can be hard wired into the fuse box of the vehicle 12 and provided with a plug on its opposite end for connection through a corresponding plug in the overhang or other area of the work station 10.

By providing the electrical outlet 64, a personal, notebook or lap top computer (not shown) can be connected to the vehicle's electrical system, positioned on the free work area 60, for use in the vehicle 12 without drawing upon its own internal battery supply. Additionally, the electrical system of the vehicle 12 can be utilized to recharge the batteries of the computer, ensuring a full charge when and if it is taken into the customer's facilities.

Two additional electrical outlets 64, also coupled to the cord 66 in the vehicle's electrical system, are located on the forward end of the inboard sidewall 46. These inboard side outlets 64, as well as the top surface outlets 46, can also be used as power sources for other electronic accessories used in the vehicle, as well as for recharging their batteries as needed. Such additional electronic equipment might include a mobile telephone or radar detector.

Three drawer-like members 68, 70 and 72 extend into the forward end of the work station 10 and are capable of being withdrawn laterally out of the inboard side wall 46 generally toward the driver's side of the vehicle. The lowermost of these members 68 is provided with a recessed area 74 and a lock 76, which accordingly provides the occupant with a secure location within the work station 10 for storing valuable and/or personal articles.

Immediately above the bottom drawer member 68 is a larger drawer-type member 70. This drawer 70 is the primary working drawer of the three. When pulled out, this drawer member 70 extends a substantial distance toward the passenger side of the vehicle. Preferably, the drawer member 70 extends so as to be located over the center console area 18 of the vehicle. However, it is important that this extension be limited so that the drawer 70 does not interfere with operation of the steering wheel 24.

Figure 3:
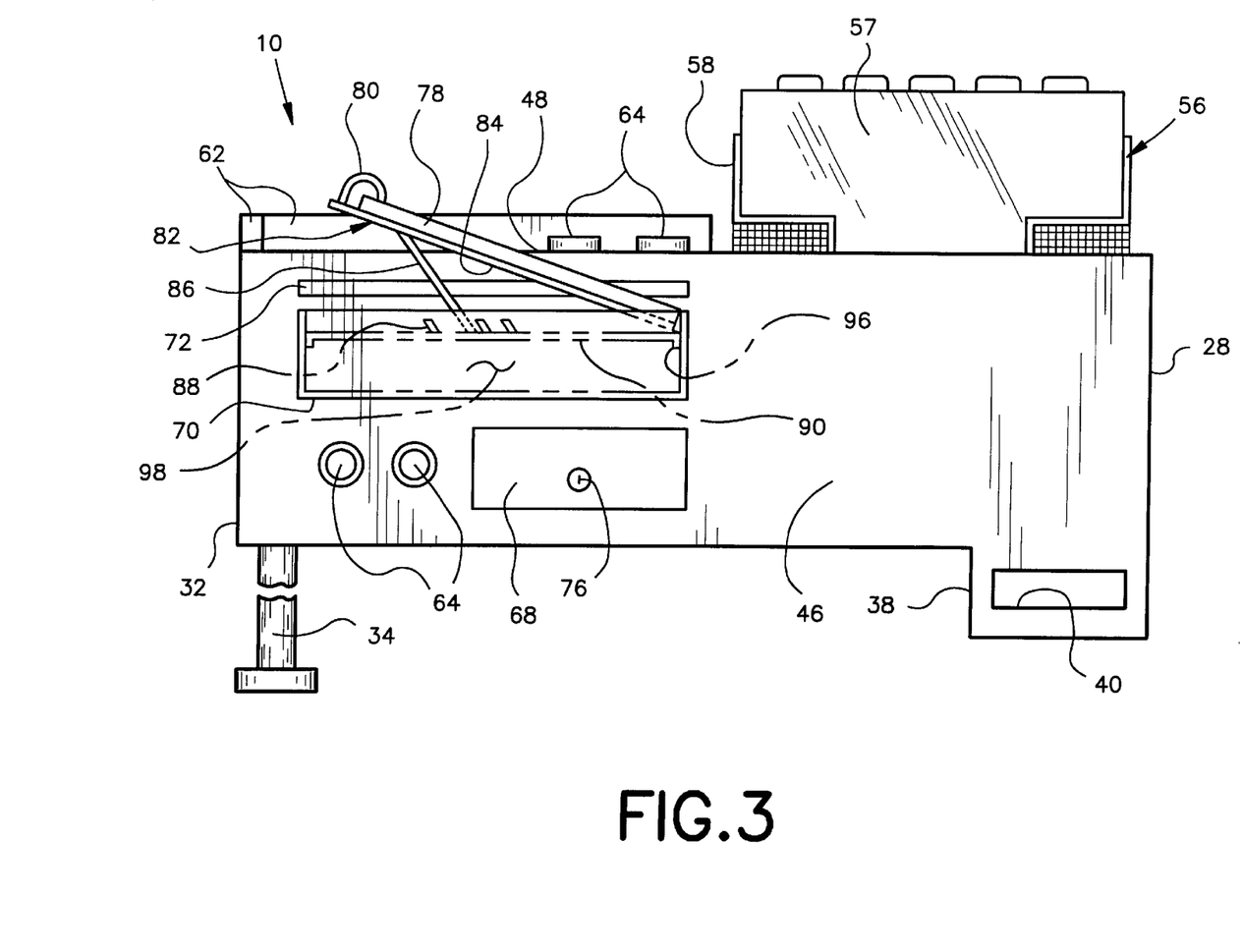
FIG. 3 is a side elevational view of the inboard side of a work station embodying the principles of the present invention.
Figure 4:
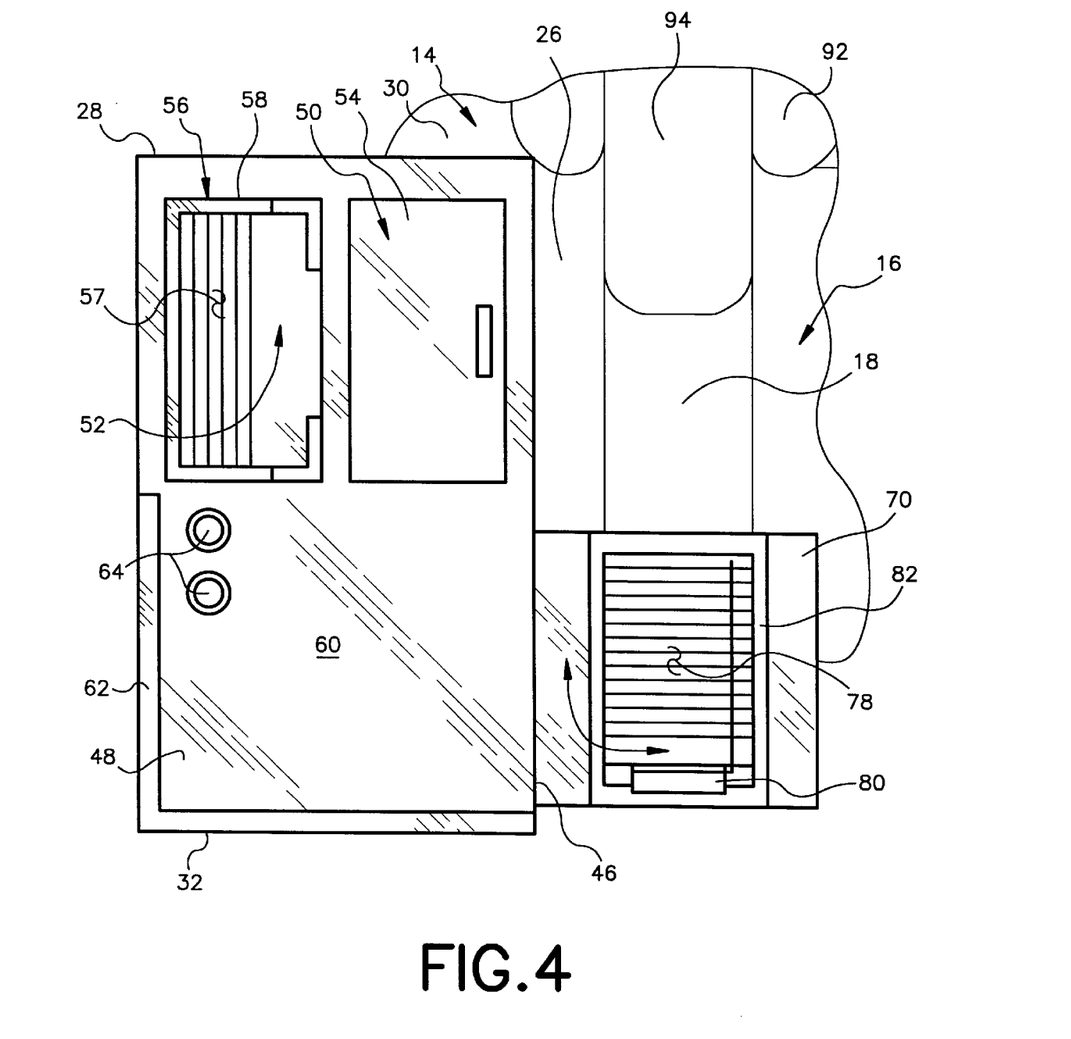
FIG. 4 is a top plan view of the in-car work station embodying the principles of the present invention and further illustrating the writing pad drawer of the present invention extended in the inboard direction, generally toward the drivers seat of the vehicle.
Figure 5:
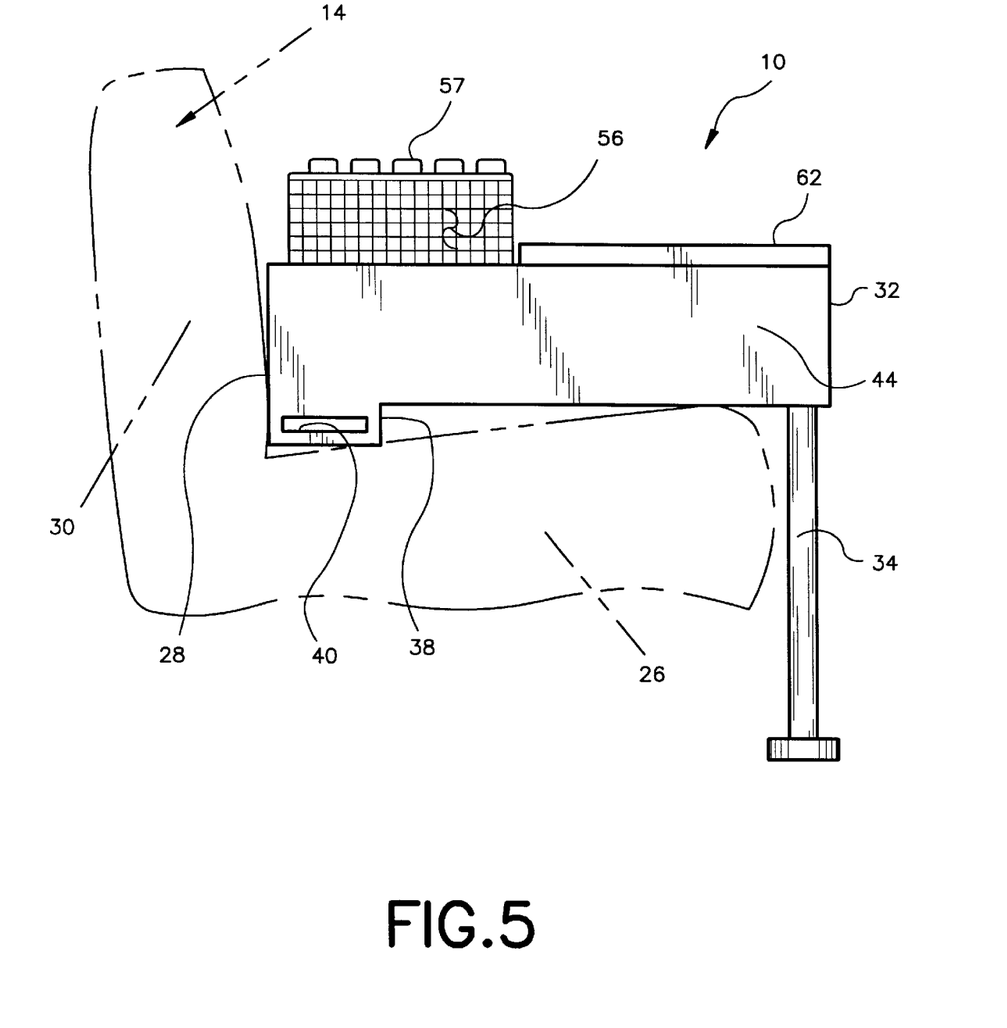
FIG. 5 is an outboard side elevational view, with the passenger seat shown in phantom, as the work station of the present invention would be viewed through the passenger door of a vehicle on which it is located.

Located within the drawer 70 and extending transversely across the width of the drawer 70 is a full sized note pad 78. The note pad 78 is mounted by a spring clip 80 or other mechanism to a tray 82 within the drawer 70. The tray 82 itself is provided with a mechanism that allows tray to be inclined into one or more positions relative to the drivers seat 16 of the vehicle 12. As seen in FIG. 3, the spring clip 80 of the tray 82 is mounted to the forward end of a support plate 84 which is hingedly connected at its rearward end to a base plate 90. A stay 86 is hingedly connected to the underside of the support plate 84 so that its distal end can engage one or more stops 88 formed in the base plate 90. By engaging the distal end of the stay 86 with one of the stops 88, the support plate 84 can be selectively positioned in one or more inclined positions. By disengaging the stay 86 from all of the stops 88 and moving it into a position substantially in surface-to-surface contact with the support plate 84, the note pad 78 can be brought into a substantially flat position. This allows the inclination of the note pad 78 to be adjusted for maximum comfort and ease of use by the occupant of the drivers seat 16. If desired the tray 82 can be provided so that it will pivot about a vertical axis further increasing the ease and comfort with which it can be used.

By providing the work station 10 with a laterally extending drawer 70 which can extend to a position over the center console 18 of the vehicle 12, it can be seen that the usefulness of the note pad and practicality of the work station is greatly enhanced. This L-shape of the work station 10 allows a right-handed driver of the vehicle to easily reach the note pad while occupying the drivers seat 16. By enabling movement of the note pad 78 toward the driver's side of the vehicle and by positioning it both over the center console and toward the forward end 32 of the work station 10, a right-handed occupant of the driver's seat is provided with a more natural orientation for writing on the note pad 78. It can also be seen that with this positioning of the note pad 78 and the work station 10, the occupant's right elbow is free from engagement with the inboard lateral bolster 92 of the driver's seat 16 as well as interference from the arm rest 94 located between the driver's seat 16 and passenger's seat 14. This is one the principal advantages of the forward and lateral location which the drawer 70 offers to the note pad 78. Additionally, by locating the note pad 78 as described above, the left-handed occupant of the drivers seat 16 is not required to twist nearly as far as would otherwise be required if no such lateral extension was provided.

As seen in FIG. 3, the baseplate 90 of the tray 82 is supported on a pair of supports 96 provided on the interior side walls of the drawer 70. The baseplate 90 can be lifted off of the supports 96 providing access into a further recessed portion 98 of the drawer 70. In this fashion, the drawer 70 provides storage space for additional note pads and/or other items.

The top drawer 72 is laterally extendible in a manner similar to the middle drawer 70. The top drawer 72 can be extended either when the middle drawer 70 is not extended or when the middle drawer 70 is extended. If the middle drawer 70 is extended, the top drawer 72 acts as a cover for the middle drawer 70. In either event, extension of the top drawer 72 provides a flat working surface which operates as an extension of the free work area 60 enabling additional materials to be spread out on the work station 10.

While the above description constitutes the preferred embodiment of the present invention, it will be appreciated that the invention is susceptible to modification, variation and change without departing from the proper scope and fair meaning of the accompanying claims.

I claim:

1. A work station for use in an automobile, said work station comprising: a base adapted to be supported on an automobile front passenger seat readily enabling use by an occupant of the automobile from a driver seat, said base including a rear end, a front end, an inboard side, an outboard side and a top surface, said rear end being positionable toward a rear portion of the seat and said front end being positionable toward a front portion of the seat, said top surface including an immovable planar portion located adjacent to said front end of said base, said planar portion operating as support surface for articles being used by the occupant of the driver seat, at least one drawer located in said base and being laterally extendable from a stored position within said base to an inboard use position where said drawer is substantially outside of said base, said drawer including a receptacle cavity adapted for storing articles therein, said cavity being accessible when said drawer is in said use position and being inaccessible when said drawer is in said stored position, and support means located within said drawer for receiving a note pad thereon and readily permitting access from the driver seat to said note pad supported thereon, said support means including a removable tray located in said receptacle cavity, said tray capable of being maintained in an inclined position.

2. A work station for use in an automobile, said work station comprising: a base adapted to be supported on an automobile front passenger seat readily enabling use by an occupant of the automobile from a drive seat, said base including a rear end, a front end, an inboard side, an outboard side and a top surface, said rear end being positionable toward a rear portion of the seat and said front end being positionable toward a front portion of the seat, said top surface being an immovable planar surface located adjacent to said front end of said base, said planar surface operating as a support surface and free work area for articles being used by the occupant of the driver seat, at least one shelf located in a forward end of said base adjacent to said front end of said base and having a width of a dimension extending only part way to said rear end of said base, said shelf being located immediately below and adjacent to said top surface and being movable from a stored position within said base to a fully extended use position where said shelf protrudes laterally from said base, in said use position said shelf forming an inboard lateral extension of said top surface and providing said work station with an L-shaped configuration, said shelf defining a substantially flat planar support surface for receiving a note pad thereon and readily permitting use from the driver seat of the note pad.

3. A work station as set forth in claim 2 further comprising a receptacle compartment located within said forward end of said base and immediately below said shelf.

4. A work station as set forth in claim 3 wherein said receptacle compartment is a drawer, said drawer being laterally movable to a fully extended position where said drawer protrudes laterally from said inboard side of said base in a use position.

5. A work station as set forth in claim 2 further comprising a well formed in said top surface adjacent to said rear end and to said outboard side of said base, said well being of a size to receive file folders therein, a carrier sized to be received in said well, said carrier being removable from said well for removing file folders from said work station and the automobile.

6. A work station as set forth in claim 5 further comprising a carrier sized to be received within said well, said carrier including handles for grasping and carrying said carrier independent of said work station.

7. A work station as set forth in claim 2 further comprising an upstanding flange formed along at least one side of said top surface and extending thereabove, said flange forming a perimeter portion of said top surface and preventing inadvertent movement of items off of said top surface during movement of the automobile.

8. A work station as set forth in claim 7 wherein said flange is provided along a front perimeter and an outboard perimeter of said top surface.

9. A work station as set forth in claim 2 further comprising leg means for supporting said front end of said base beyond said front portion of said passenger seat, and leg means being vertically adjustable and extending downward from said base to contact flooring in said automobile.

* * * * *